United States Patent [19]
Detwiler

[11] 3,942,190
[45] Mar. 2, 1976

[54] METHOD AND APPARATUS FOR UNINTERRUPTED RECORDING AND REPRODUCTION IN A MULTICHANNEL MODE OF INFORMATION ON TAPE

[75] Inventor: Barry C. Detwiler, New Milford, N.J.

[73] Assignee: Matsushita Electric Industrial Co., Ltd., Kadoma, Japan

[22] Filed: Mar. 21, 1974

[21] Appl. No.: 453,511

[52] U.S. Cl. ..................... 360/63; 360/74; 360/90; 226/113; 226/119; 178/6.7 A; 179/100.3 B; 179/100.3 D
[51] Int. Cl.² .......................................... G11B 15/06
[58] Field of Search ............. 360/63, 74, 90, 93, 96; 226/118, 119, 113; 179/100.3 B, 100.3 D; 178/6.7 A

[56] References Cited
UNITED STATES PATENTS

| | | | |
|---|---|---|---|
| 2,819,940 | 1/1958 | Sorrells | 360/74 |
| 3,482,230 | 12/1969 | Girling | 360/63 |
| 3,682,363 | 8/1972 | Hull | 226/118 |

*Primary Examiner*—James W. Moffitt

[57] ABSTRACT

A tape information playback and recording system operating in a multichannel mode is arranged to provide uninterrupted recording or reproduction of information from a tape recorded in a multichannel track configuration mode. The system includes a pair of tape reels, a pair of spaced-apart tape drives for pulling the tape in opposite directions through the system, a pair of tape head systems positioned in spaced-apart relation each tape head system being associated with a tape drive, and a tape accumulator positioned between the tape heads and tape drives. The tape accumulator stores tape when the tape moves through the system in a forward direction. During reversal of the direction of tape travel, the tape accumulator supplies tape in both the forward and reverse directions simultaneously while tape is depleted from the accumulator to permit reversal of the direction of tape travel without loss of information.

18 Claims, 5 Drawing Figures

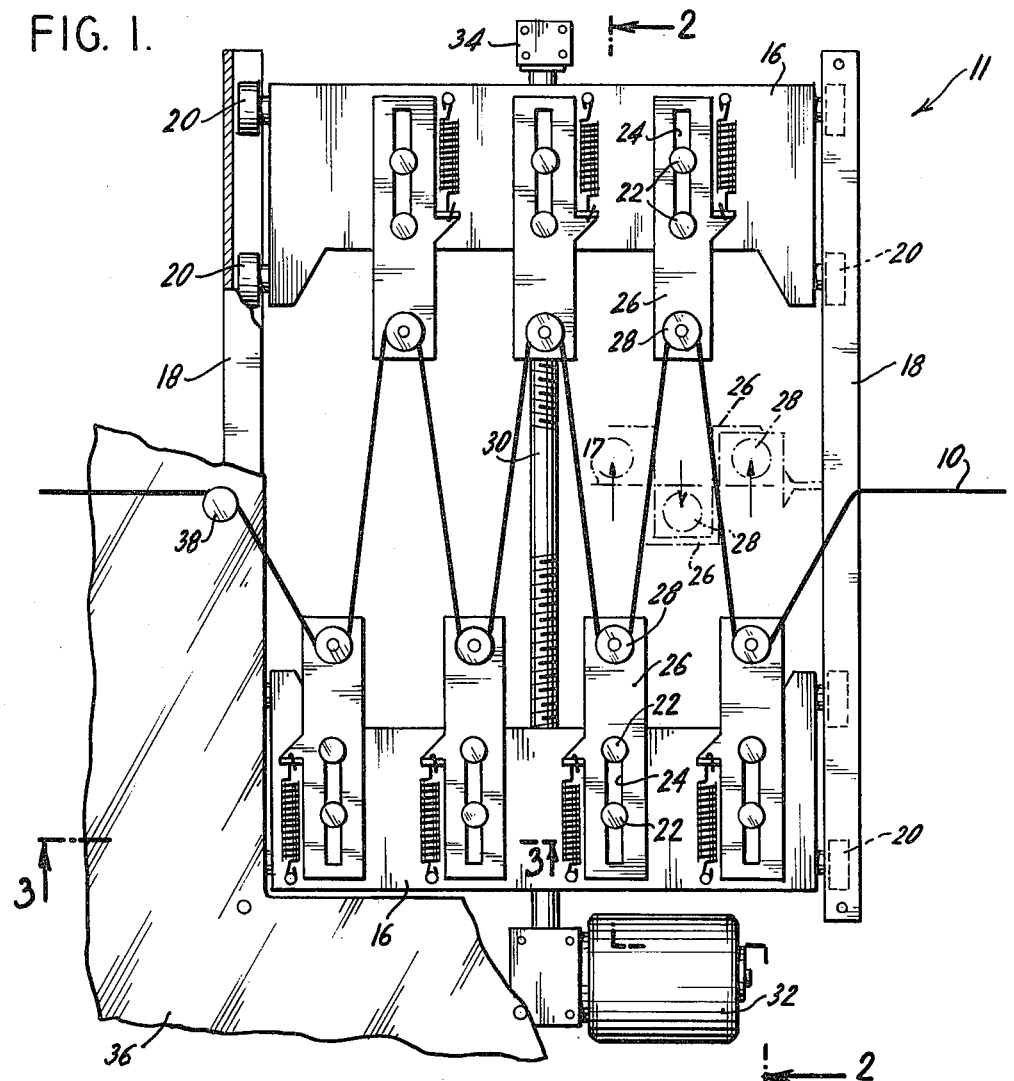
FIG. I.
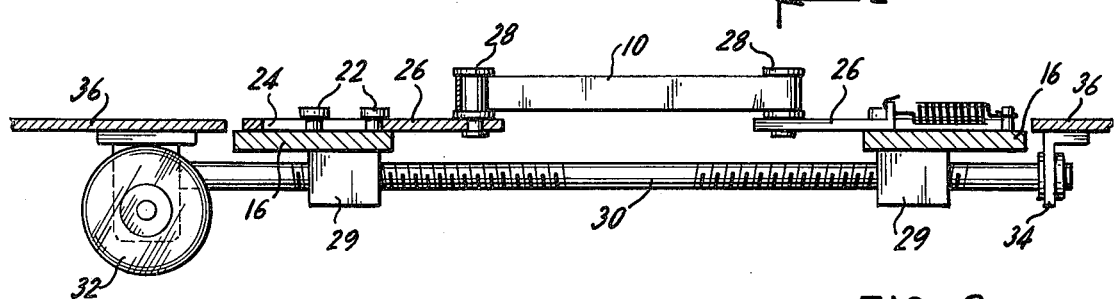
FIG. 2.
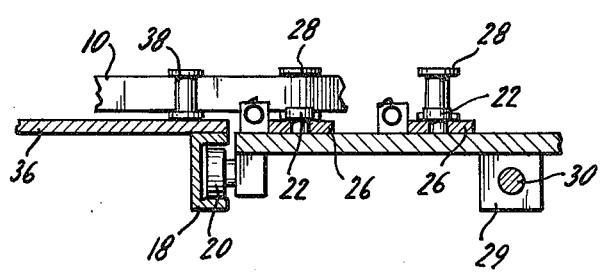
FIG. 3.

METHOD AND APPARATUS FOR UNINTERRUPTED RECORDING AND REPRODUCTION IN A MULTICHANNEL MODE OF INFORMATION ON TAPE

BACKGROUND OF THE INVENTION

The invention relates generally to tape recording and reproducing systems and in particular to systems for recording and reproducing information from a multichannel tape without interrupting the flow of information.

In multichannel tape recording and reproducing systems, information is generally recorded on or reproduced from one or more tape channels while the tape is run in a forward direction, the direction of tape motion is reversed and information is recorded or reproduced from different channels of the tape as the tape is run in the reverse direction. Reversing systems for automatically reversing the direction of tape motion have been developed. An example of one of these systems can be found in U.S. Pat. No. 2,213,631 issued to Heller et al., on Sept. 3, 1940. In this system, tape is driven first in one direction and then in the reverse direction with recording or reproducing of information occurring in each direction of tape travel on adjacent channels of the tape and reversal of direction occurring automatically as the end of the tape is approached. The reversal of direction however is not instantaneous but requires a finite transition time, including the time required for the tape to stop, to change direction of motion, and to return to proper operating speed in the new direction of motion.

There are many instances when it is necessary to record or reproduce information which continues for an indefinite period of time without interruption. Thus, in data acquisition systems, a data source furnishes data to a multichannel recording system for an uncertain time period which may exceed the storage capacity of one of the channels of the tape. Since it is undesirable to stop the flow of data to the tape system, it is necessary that the tape system be capable of recording the data on another channel of the tape without losing any of the information. Similarly, it is necessary to reproduce the information without losing any of the recorded information. The automatic reversing system described above will not meet this need since it requires a finite transition time to reverse the direction of travel during which portions of the continuous flow of information will be lost. To overcome this problem, relatively complex systems have been devised. One such system is disclosed in U.S. Pat. No. 3,445,832 issued to Leeke et al. on May 20, 1969. This relatively complex system utilizes two independent tape recording and reproducing systems and achieves uninterrupted information flow by recording the same information at the end of one tape in one system and the beginning of another tape in the second system. A control signal is recorded on special channels on both tapes concurrently with recording the information. During reproduction of the recorded information, the tape in the second tape system is started as the end of tape in the first tape system is approached. The control signals on both tapes are compared and when the tapes are running in phase synchronization, reproduction of information is switched to the second tape system without interrupting the flow of information. This system requires two complete tape systems and a relatively complex synchronization between the systems.

SUMMARY OF THE INVENTION

In accordance with this invention, uninterrupted recording and reproduction of information is provided in a tape system in a multichannel mode which includes a tape accumulator positioned in the path of tape travel, a pair of tape drives positioned on opposite sides of the accumulator and adapted to pull the tape in reverse directions, a pair of tape head systems are positioned on opposite sides of the tape accumulator and adapted to provide a flow of information relative to the tape and a pair of tape storage reels for storing tape at opposite ends of the path of tape travel. Both tape head systems may consist of any number of heads or may consist of a multiple head for stereo, quadraphonic or any other multichannel purpose.

The operation of the tape system can be divided into three phases. During the first operating phase, tape is moved in a first direction of motion past one of the tape heads which reads or records information on one of the channels of the tape. When reversal of the direction of tape travel is desired, a second or transition operating phase is initiated. During the transition phase, a portion of the tape moves in a reverse direction adjacent to the second tape head system which is positioned to read or record information on a second channel of the tape, the direction of tape movement at the first tape head system remaining unchanged while tape being supplied in both directions of tape travel from the tape accumulator. When the tape movement relative to the second tape head system fully reaches its proper speed, the first tape head system is deactivated and simultaneously the second tape head system is activated to cause information to be read or recorded on a second channel of tape. Finally, the direction of motion of the tape adjacent to the first tape head system is reversed and the system enters the third phase of operation where the entire tape moves in the reverse direction and information is recorded or reproduced by a second tape head on a second channel of the tape. This reversal of direction of tape movement occurs without interrupting the flow of information for recording onto or reproduction from the tape. In a similar manner, the direction of tape travel can be reversed any number of times until the entire storage capacity of all channels on the tape has been utilized.

The above brief description, as well as further objects, features and advantages of the present invention will be more fully appreciated by reference to the following detailed description of presently preferred, but nonetheless illustrative, embodiments of the present invention when taken in conjunction with the accompanying drawings.

BRIEF DESCRIPTION OF THE DRAWINGS

FIG. 1 is a top plan, partially broken away, of a portion of a recording system showing the tape accumulator.

FIG. 2 is a sectional view taken along the lines 2—2 of FIG. 1 and looking in the direction of the arrows.

FIG. 3 is a sectional view taken along the lines 3—3 of FIG. 1 and looking in the direction of the arrows.

DESCRIPTION OF THE PREFERRED EMBODIMENT

Figure 4:
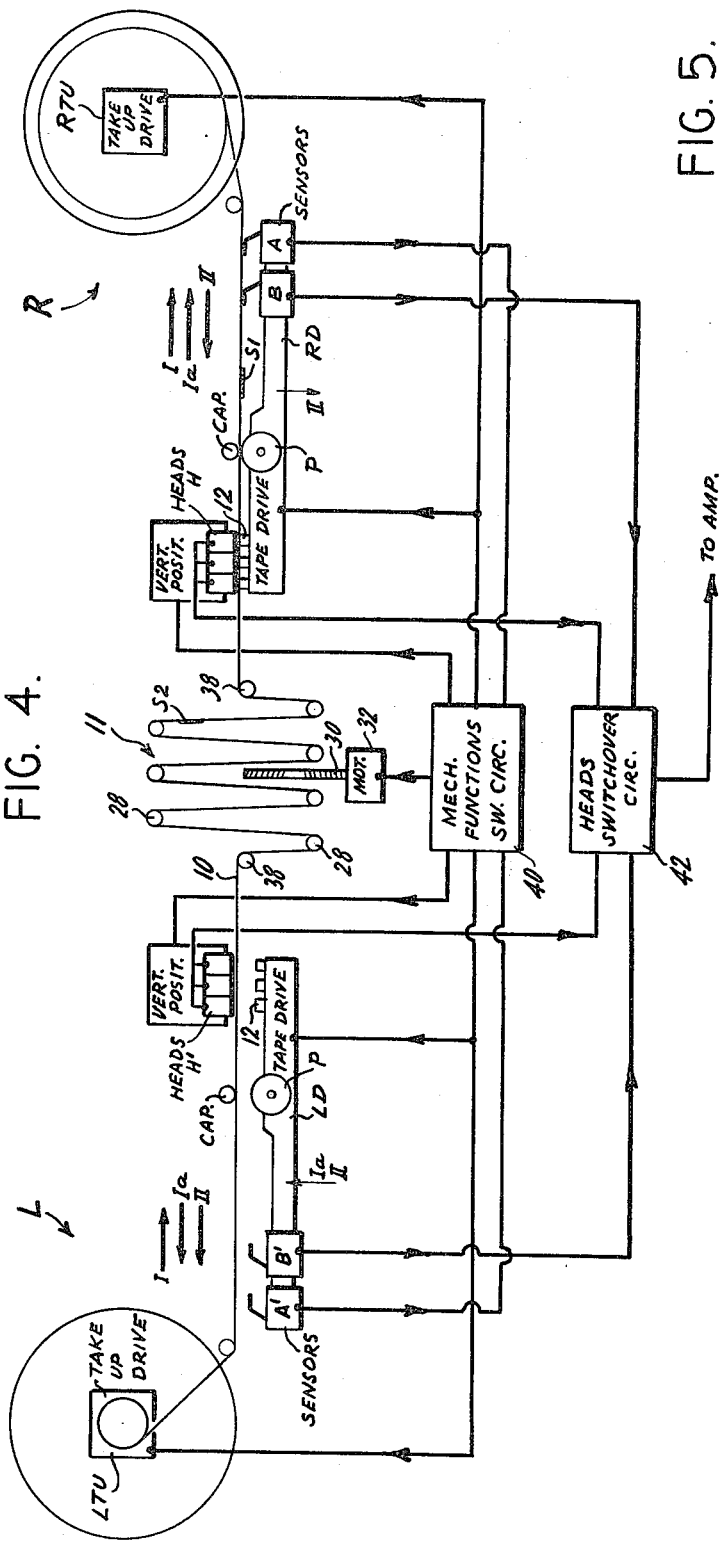
FIG. 4 is a diagrammatic and schematic representation illustrative of features of the invention.

Tape systems for recording and/or playback of information generally utilize a multichannel tape which may be any flexible supporting material of fixed nominal width covered with a medium, such as, but not limited to, an oxide having magnetic retentivity or a photographic emulsion, which can be used for producing or recording information, such as, but not limited to, audio or video signals or computer data. The tape is guided to travel along a path between two tape reels which store tape at the opposite ends of the path of tape travel and function either to supply or takeup tape, dependent on which direction the tape is travelling through the system at a given time. Of course other means may be used to store tape at the opposite ends of the path of tape travel and as used herein, tape reel shall be taken to encompass any such device for tape storage.

The system is arranged with the supply or feed reel at the rearward end of the path of tape travel supplying tape into the tape system and the take-up reel at the forward end of the path of tape travel to store tape after it moves through the system. Thus tape moves away from the reel designated the feed reel and toward the reel designated the take-up reel. It will be understood that each reel can be operated as either a feed reel or a take-up reel and that when reversal of direction of tape movement occurs, the reel which initially was the feed reel becomes the take-up reel and the reel which initially was the take-up reel becomes the feed reel. Therefore the designation feed reel and take-up reel is used herein for convenience in describing the system operation and to designate the tape reels at their initial operation.

The reel functioning as the supply reel rotates freely except for necessary back tension as may be required, which allows tape to be pulled from the supply reel at a constant speed, as will be described below. The take-up reel, however, must be capable of winding up the tape after it has been pulled through the system and since the tape is wound from a small diameter at the beginning of the reel to a larger diameter at the end of the reel, while the speed of the tape moving onto the reel remains constant, the rotational speed of the reel must be changed as the amount of tape on the reel changes. Thus, a variable speed take-up drive is associated with each reel to drive the reel at a variable speed when in the take-up mode. One common take-up drive utilizes a slipping clutch which produces a change in the rotational speed of the take-up reel because of slippage between two discs. Other take-up drives accomplishing the same result can also be used.

Tape systems also include tape drives which pull the tape, at constant speed, through the system. The tape drive for magnetic tape generally has a metallic shaft, or capstan, rotating at a constant speed, and a pressure roller commonly made of elastic material which presses the tape against the rotating capstan. Magnetic tape devices further include magnetic tape heads for recording and playback of information on tape and for erasing information which has been previously recorded on the tape. Record and playback heads are essentially similar in basic design and therefore many tape systems utilize only one head for accomplishing both functions. In a magnetic tape system, the record or playback head has a coil of wire wound on a gapped ring of laminated ferro-magnetic material, having a small gap at one point. An electrical signal is applied to the coil during recording to change the local magnetic particle-orientation of the tape, while during playback, the spatial variation of local magnetic particle-orientation of the pre-recorded tape are sensed and converted into varying electrical signals in the coil. The erase head, similarly includes a ring of magnetic material, however, the erase head has a relatively wide gap. A source of high frequency current called bias causes a series of polarity reversals of the magnetic orientation of the portion of the tape which is between the gap. When the tape leaves the gap, it may be considered as in an essentially magnetically neutral condition.

What has just been described are the basic elements in a tape system. These elements together with others are shown arranged in FIG. 4 to carry out the objects of this invention. Thus a tape to be used in a multichannel mode, generally designated as 10, is guided to travel along a path of travel between the left and right tape units, LTU and RTU respectively. The variable speed take-up drive is shown for each tape reel. These tape units are shown as conventional tape reels, but it will be understood that the system would operate equally as well with any device which stores and supplies tape at the opposite ends of the path of tape travel.

The system also includes left and right tape drives, LD and RD respectively, each having a capstan, CAP, and pressure roller P for pulling the tape respectively toward the left or right, tape heads designated H' and H. Pressure pads or gates 12 may be used in certain transport embodiments for maintaining the tape contact with the heads. In other embodiments, vacuum, tension or other means may be used. As shown, each head system includes separate record, playback and erase head, however as described above, the record and playback heads can be the same. The tape drive also includes sensors A', B' and A, B, whose function will be discussed below.

Positioned in the path of tape travel between the left and right tape drives, is a tape accumulator, or storage and supply assembly, generally designated by reference numeral 11, which stores tape along a path of tape travel which is greater than the distance between the left and right tape drives. As will be explained in greater detail below, the tape accumulator stores tape while the tape is pulled either toward the left or right during the normal record or playback function of the system and supplies tape in both the left and right directions simultaneously during reversal of movement of the tape so that the reversal can occur without loss of any information.

Referring now to FIGS. 1–3, tape accumulator 11 is shown in greater detail. The accumulator has transverse plates 16 disposed on opposite sides of transverse axis 17, (partially shown) and supported in longitudinal channels 18 by wheels 20. Mounted on plate 16 are stops 22 which extend through channels 24 formed in the rearward portions of spring-biased idler arms 26 and which are successively positioned transversly on opposite sides of the axis. Arranged proximate to the forward ends of idler arms 26 are guide rollers 28 for guiding the tape through the tape accumulator. Mounted below plate 16 are threaded blocks 29 adapted to receive rod 30 threaded in opposite senses at its opposite ends and which has one end coupled by a suitable gear arrangement to motor 32 and the opposite end rotatably supported in bracket 34. The entire tape accumulator is attached to support plate 36, partially shown, in cooperative relation with the remainder of the tape system. Plate 36 also has upwardly extending idlers 38 mounted thereon for accurately guiding the tape into and out of the tape accumulator.

Prior to using the tape system, the tape must be positioned between the left and right tape units as shown in FIG. 4. To this end, motor 32 is activated causing rotation of threaded rod 30 which moves plates 16 inwardly until guides 28 are in the position shown by the dotted lines in FIG. 1, at which point the plates activate a microswitch, not shown, to automatically stop the motor. With the idlers in this position, the tape can be threaded straight through the tape accumulator or can be contained in a cassette which, when positioned on the tape drive, automatically places the tape in a straight path through the accumulator. After the tape has been threaded, motor 32 is reactivated to move the plates and tape outwardly until another microswitch, not shown, is activated to stop the motor when plates 16 are in their outward operating position. In the case of a cassette, appropriate openings could be provided to accomodate the tape accumulator idlers for access to the tape. In the outward operating position, the tape thus becomes threaded through the tape storage and supply assembly in a zig-zag fashion with the length of tape stored being greater than the distance between guides 38.

Figure 5:
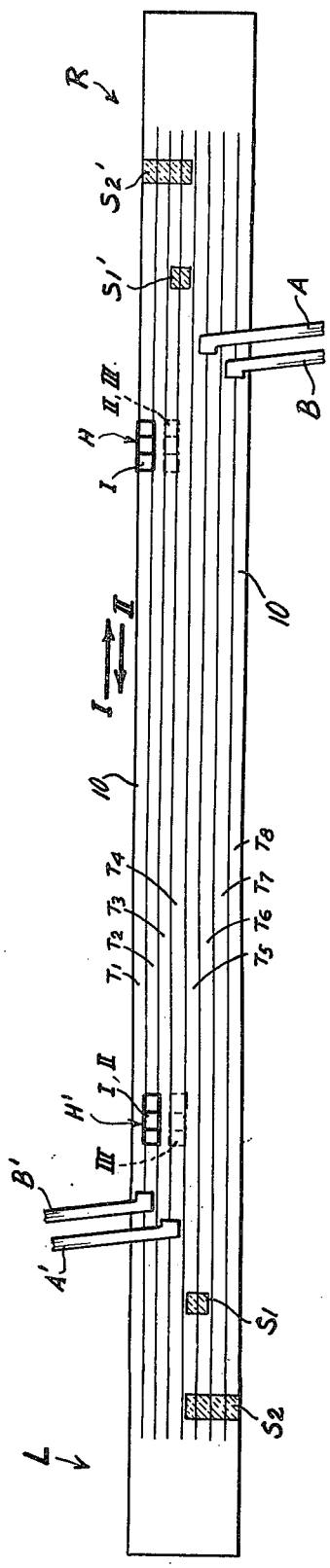
FIG. 5 is a diagrammatic representation showing a shortened multichannel tape and the relative positions of sensors and tape heads.

There will now be described in detail a typical operation of the tape system operating to record information in a continuous manner on magnetic tape. It is understood that the system can also be used to reproduce prerecorded information and is described here by way of example only, without intent to limit the scope of the invention in any way. A brief description of the operation of an information reproducing system is provided below. With reference to FIGS. 4 and 5, the multichannel tape typically has any even number of contiguous channels, eight channels, T1 through T8, being used in FIG. 5 for illustration only, extending transversly along the width of tape. Tape head H is positioned to record information on channel T1 while the tape moves in the direction of arrow I. When the storage capacity of channel T1 is fully used, the direction of tape travel is automatically reversed so that tape travels in the direction indicated by arrow II and information is recorded on channel T2 by tape head H'. In a similar manner information can be recorded on any number of channels by appropriately translating the tape heads across the tape, as indicated by the dotted positions of tape head H and H' in FIG. 5, or by providing multiple tape heads which extend across the width of the tape and which can be activated to record information on alternate tape channels.

The operation of the system can be divided into three phases; phase I wherein the tape moves in the direction of arrows I; a second or transition phase, indicated by arrows Ia; and a third phase wherein the direction of movement is reversed and the tape moves in the direction of arrows II.

To record information on channel T during phase I of operation, the right tape drive is positioned proximate the tape with tape head H in cooperative relation with channel T1, and the left tape drive is in an inoperative position with respect to the tape. With the tape pressed against the capstan by pressure roller P, the capstan pulls the tape at a constant speed from the left tape reel which acts as a tape supply around the guides 28 in the tape accumulator and past tape head H. The right tape reel is driven by the take-up drive to wind the tape.

For recording, head switchover circuit, 42, activates the record head of the tape head H. As the tape passes the record head, information signals fed into the tape system, as from a data source or as an audio signal, pass through the tape system amplifiers, as shown schematically in FIG. 4, to the head switchover circuit 42 and then to the record head of tone head H. The signal on the record head causes a change in the properties of the coating on the tape in accordance with the input information to the tape system thereby permanently recording the input information. Information is recorded on channel T of the tape in this manner until the entire storage capacity of this channel is utilized.

When the entire storage capacity of channel T has been utilized, the direction of tape motion is automatically reversed, and information recorded on channel T2 without stopping the flow of information and without the loss of any information. To this end, two signals, represented by S1 and S2 are prepositioned near the end of the tape. These signals can be non-audible signals pre-recorded on the tape, or strips of foil mounted on the tape. As the tape is pulled past the tape head and wound on the right take-up reel, signal S1 passes sensors A and B which are conventional sensors arranged to sense the signal on the tape. For a pre-recorded inaudible signal on the tape, the sensor could be a conventional electromagnetic playback head. A foil signal can be sensed by a conventional double contact post-type head, with the foil acting to complete the circuit. The signals and sensors are cooperatively arranged, corresponding to the appropriate channel on the tape, so that signal S1 is detected only by sensor A.

When signal S1 passes sensor A, the transition phase, Ia, is initiated. The sensor produces an output signal which is coupled to the mechanical functions switching circuit 40. In response to this signal, the mechanical function switching circuit produces a signal which causes the left tape drive to be moved to its operative position approximate the tape with pads or gates 12 or other device pressing the tape into contact with the inoperative record head of tape heads H' which is in cooperative relation with channel T2. With the left tape drive in this position, pressure roller presses the tape into contact with the rotating capstan which begins to pull the tape past tone head H' in the direction of arrow Ia. Thus, the tape is being pulled in the opposite direction by the capstans of the right and left tape drives and the left take-up.

Tape is supplied for both directions of tape travel by the tape accumulator 11. Upon receiving a signal from sensor A, the mechanical functions switching circuit activates motor 32 which causes rotation of threaded rod 30 to move guides 28 inwardly, as previously explained. As the guides move, tape becomes available and is pulled from accumulator 11 by the capstans. The rate of inward motion of the guide wheels is coordinated with the rate at which the tape is pulled by the capstans to insure proper tension on the tape during the transition phase so that information recording can occur. In response to the signal from sensor A, the mechanical function switch circuit also activates the take-up drive associated with the left tape reel which reverses the direction of rotation of the reel causing it to act as a storage reel to wind the tape being pulled past tone head H' by the left tape drive.

In summary, during this portion of the transition phase, information is recorded on channel T1 by the record head of tape head H while tape is pulled past tape heads H and H' in opposite directions from the tape accumulator by the left and right tape drives. Both left and right tape reels function as take-up reels and are driven by their respective take-up drives.

After a pre-determined time interval, which is sufficient to allow the tape to reach its proper operating speed in relation to tone head H' in the direction of arrow II, a second pre-positioned signal S2 passes sensor B. Sensor B produces an output signal in response to signal S2 which is coupled to the head switchover circuit. Upon receiving this signal, the head switchover circuit simultaneously activates the record head of tape head H', and deactivates the record head of tape head H. Since tape head H' is cooperatively positioned with channel T2, information recording is switched from channel T1 to channel T2 without interruption of the flow of information or loss of any information. It should be noted, that at this time, the tape is being pulled in the direction of arrows Ia and tape is still being supplied from the tape accumulator in both left and right directions.

After another time interval, signal S2 passes sensor A which produces an output signal which is coupled to the mechanical functions switching circuit. Upon receiving the second signal from sensor A, the mechanical functions switching circuit causes the right tape drive to move to its inoperative position and deactivate the take-up drive associated with the right tape reel. The system now operates in the third phase with the entire tape now pulled in the direction of arrows II, and the right tape reel rotates to supply tape to the system and now functions as the feed reel. The mechanical functions switching circuit also causes the direction of rotation of motor 32 to reverse, causing guides 28 to move outwardly until they reach a normal operating position to replenish the supply of tape in the accumulator for use during subsequent reversal operations. Thus, the direction of motion of tape travel has been reversed during a period when a continuous flow of information is coming into the tape system and this information has been recorded without the necessity of interrupting the flow of information and without the loss of any information or the necessity of recording the same information on two separate channels.

Information continues to be recorded on channel T2 until the storage capacity of that channel T2 is fully used except for a relatively short amount of tape used for maintaining mechanical connection to the feed reel. If more information is to be recorded in the system without interruption, the direction of motion of tape travel is again automatically reversed in a manner similar to that described above and the information continued to be recorded on channel T3 of the tape. This second reversal will now be briefly described.

With the left tape drive in its operative position, sensors A' and B' are operative to detect signals S1' and S2' positioned near the left end of the tape. As described above, when the end of the storage capacity of channel T2 is approached, signal S1' passes sensor A' which produces a signal coupled to mechanical functions switching circuit 40. The mechanical functions switching circuit causes the right tape drive to be operatively positioned proximate the tape, causing the tape to be pulled past tape head H in the direction of arrow Ia. Motor 32 is activated and the tape accumulator supplies tape in both directions of tape travel. As this time, tape head H is cooperatively positioned with channel T3 of the tape either by having been previously translated along the width of the tape as would be required in a tape system utilizing two tape heads, or by use of a separate tape head associate with each tape channel. After a predetermined time, during which the tape moving past tape head H reaches its operating speed, signal S2' is detected by sensor B' which produces signal to cause the head switchover circuit to activate the record head in tape head H, and deactivate the record head in tape head H'. Information is now recorded on channel T3. Finally, sensor S2' passes sensor A' which produces a signal coupled to the mechanical functions switch circuit 40 to disengage the left tape drive. Thus, the direction of movement of the tape is again reversed without interrupting the flow of information or losing any of the continuous information.

The same tape system can also be used, in the manner described above, to reproduce information which has been previously recorded on a tape. Since the operation of the tape system in the reproduction mode of operation is almost identical to the record mode of operation, the use of the system to reproduce information will only be briefly described with emphasis on the differences between the two modes of operation. Assume that continuous information, pre-recorded on a number of contiguous channels of a tape along with the appropriate sensor-activation signals, has been properly threaded through the tape system. The right tape drive is in its operative position and tape is being pulled in the direction of arrows I, from the left tape reel, through the tape accumulator and past the playback head of tape head H, which is cooperatively aligned with channel T1. The playback head of tape head H is operative to sense the signals on channel T1 of the tape and couple then through the head switchover circuit to the amplifiers and output of the tape system. Near the end of the tape, sensor A detects signal S1 and produces an output signal which is coupled to the mechanical functions switching circuit 40. As described above, the left tape drive is brought into operative position causing the tape to be pulled past tape head H' in the direction of arrows Ia, and engaging the take-up drive of the tape reel so that the reel winds up the tape which is being pulled to the left. Also, motor 32 is activated to move guides 28 inwardly to supply tape in both directions of tape travel.

After a predetermined time, signal S2 is sensed by sensor B which produces an output signal to activate the playback head of tape head H' and deactivate the playback head of tape head H. Information now is reproduced from channel T2 of the tape. Since the relationship between the sensors and signals is the same during the recording and reproducing process, switching the playback from channel T1 to channel T2 occurs at the same time relative to the information flow as during the recording process and the information is therefore reproduced without interruption or loss. Finally, signal S2 is sensed by sensor A which produces an output signal coupled to the mechanical functions switching circuit 40 to disengage the right tape drive, and reverse the direction of motor 32 to return the tape storage and supply assembly to its outward operating position wherein tape is stored for the next reversal cycle. In this manner, the direction of tape travel is reversed without interruption of the flow of recorded information from the tape. When all the information on channel T2 has been reproduced, the tape can again be reversed in a similar manner to reproduce the information recorded on channel T3, and so on, until all the information on the tape has been reproduced.

Stated in still another way, a continuous flow of information is provided relative to a multichannel recording medium which is movable between first and second locations at opposite ends of a path of tape travel which alternately act as take-up and feed for the recording medium. An inline tape accumulator is provided and tape moves from the first to the second location through the accumulator in a first direction while information is transferred relative to the recording medium between the accumulator and the second location. When a reversing signal is sensed, the recording medium continues to move in the first direction between the accumulator and the second location while simultaneously, the movement of the recording medium is initiated in the opposite direction between the accumulator and the first location with portions of the recording medium being drawn from the accumulator in both directions. After a convenient interval, transfer of information between the accumulator and the first location is terminated, and information transfer is initiated between the accumulator and the second location. Finally, movement of the recording medium in the first direction between the accumulator and the second location is terminated and the supply of tape is replenished in the accumulator and the entire recording medium moves in the opposite direction toward the second location.

It will be understood that the specific embodiment herein given is for illustrative purposes only, and that various changes in design, structure and in arrangement of the system may be made without departing from the spirit and scope of the invention. For example, it may be desirable to have fast access to information on the tape. In such a situation, the information can be recorded on only a portion of an entire tape channel. When that portion of the channel is used, the tape can be automatically reversed and the information recorded on the next channel. Also, it may be desirable to initiate the reversal of tape motion manually rather than automatically

What I claim is:

1. A multichannel tape information recording and playback system comprising a tape accumulator positioned along a path of tape travel through the system, a pair of tape drives positioned in spaced-apart relationship on opposite sides of said tape accumulator and adapted to pull said tape in reverse directions along the path of tape travel, a pair of tape head systems positioned on opposite sides of said tape accumulator and adapted to provide a flow of information relative to said tape, and a pair of tape storage reels for storing tape at the opposite ends of the path of tape travel, said tape accumulator being adapted to store tape in motion while said tape is moving in a forward or reverse direction and for supplying tape in both the forward direction and reverse direction simultaneously while said tape is depleted from said accumulator so that the direction of motion of said tape is reversed without interrupting the flow of information relative to the tape.

2. A multichannel tape information recording and playback system having a first operating phase wherein said tape travels in a first direction and information flows relative to one of the channels of said tape, a transition operating phase, and a third operating phase wherein said tape travels in a reverse direction of motion and information flows relative to a second channel of said tape, the direction of tape travel being reversed without interrupting the flow of information relative to said tape, comprising, a tape accumulator for storing said tape during said first and third operating phases and for supplying tape simultaneously in both directions of tape travel during said transition operating phase, a pair of tape drives positioned on opposite sides of said tape accumulator and adapted to pull said tape in opposite directions from said tape accumulator, a pair of tape head systems positioned on opposite sides of said tape accumulator and adapted to provide a flow of information relative to separate channels on said tape, a pair of tape reels for storing tape at the opposite ends of the path of tape travel, and control means operative during said transition operating phase for reversing the direction of motion of tape relative to one of the tape heads while the tape moves in a forward direction past the other head, hed, for controlling said tape accumulator to supply tape simultaneously in both directions of tape travel while the supply of tape is depleted from the assembly, for simultaneously deactivating one of said tape heads and activating the other of said tape heads after a delay sufficient to allow said tape to reach its proper operating speed in said reverse direction of tape motion and for reversing the direction of motion of the remaining portion of said tape so that the entire tape moves in the reverse direction, and for replenishing the supply of tape in said tape accumulator so that the reversal of direction of tape movement occurs without interruption of the flow of information relative to the tape.

3. The system of claim 2 wherein said tape information and playback system includes means for sensing the depletion of tape from at least one of said tape reels to automatically initiate said transition operating phase.

4. The system of claim 2 wherein said tape accumulator includes means for guiding said tape through said tape accumulator along a path of tape travel which is greater than the distance between said tape heads.

5. The system of claim 3 wherein said means for sensing the depletion of tape includes a pair of sensors positioned on opposite sides of said tape accumulator and adapted to detect prepositioned signals located near the end of said tape.

6. In a tape system having take-up and feed reels, the method of reversing the direction of tape motion between said take-up and feed reels without interrupting the flow of information relative to the tape comprising the steps of storing the tape at a position intermediate said take-up and feed reels, providing a flow of information relative to the tape at a position of tape travel between the position of tape storage and said take-up reel, reversing the direction of motion of the tape between the position of tape storage and the feed reel while the direction of motion of tape between the position of the tape storage and the take-up reel remains the same, switching the position along the path of tape travel at which information flows relative to the tape from a point between the position of tape storage and the take-up reel to a position between the position of tape storage and the feed reel, and reversing the direction of movement of the tape between the take-up reel and the position of tape storage so as to reverse the direction of motion of tape travel without interrupting the flow of information relative to the tape.

7. The method of claim 6 further including the step of replenishing the tape at the position of tape storage intermediate the take-up and feed reels after the direction of tape motion is reversed.

8. The method of claim 7 wherein said tape is a multichannel tape and the information flows relative to different channels on said tape when the direction of tape movement is reversed.

9. A method of continuously providing a flow of information relative to a multi-channel recording medium movable between first and second locations at opposite ends of a path of tape travel serving alternately as take-ups and feed for said recording medium comprising providing an in-line tape accumulator for said recording medium between said first and second locations, moving said recording medium from said first location through said accumulator in a first direction to said second location, transferring information relative to said recording medium between said accumulator and said second location, sensing a reversing signal, continuing the movement of said recording medium in said first direction between said accumulator and said second location by drawing portions of the recording medium stored in said accumulator in said first direction while simultaneously initiating the movement of said recording medium in the opposite direction between said accumulator and said first location by drawing portions of said recording medium stored in said accumulator in said opposite direction and after an interval transferring information to said recording medium between said accumulator and said second location and terminating transfer of information between said accumulator and said first location, terminating the movement of said recording medium in said first direction between said accumulator and said second location so that said recording medium moves in said second direction from said second location to said first location to provide a continuous flow of information relative to the recording medium.

10. The method of claim 9 wherein the information is transferred to a first channel of said multichannel tape between said accumulator and said second location and the information is transferred relative to a second channel of said tape between said accumulator and said first location.

11. The method of claim 9 wherein said reversing signal occurs when the runout of tape from said first location acting as a feed, is imminent.

12. An apparatus for continuously providing a flow of information relative to a multichannel recording medium movable between first and second locations at opposite ends of a path of tape travel serving alternately as pick-up and feed for said recording medium comprising an inline accumulator for said recording medium between said first and second locations, means for moving said recording medium from said first location through said accumulator in a first direction to said second location, means for transferring information relative to said recording medium between said accumulator and said second location, means for sensing a reversing signal, means for continuing the movement of said recording medium in said first direction between said accumulator and said second location and for simultaneously initiating the movement of said recording medium in the opposite direction between said accumulator and said first location with portions of said recording medium being drawn from said accumulator in both directions, means for simultaneously transferring information after an interval to said recording medium between said accumulator and said second location and for terminating transfer of information between said accumulator and said first location, means for terminating the movement of said recording medium in said first direction, means for terminating the movement of said recording medium in said first direction between said accumulator and said second location so that said recording medium moves in said second direction from said second location to said first location to provide a continuous flow of information relative to the recording medium.

13. The apparatus in claim 12 wherein information is transferred to a first channel of said multichannel tape between said accumulator and said second location and the information is transferred relative to a second channel of said tape between said accumulator and said first location.

14. The apparatus of claim 12 wherein said reversing signal occurs when the runout of tape from said first location acting as a feed is imminent.

15. A tape handling system for use in the recording of information on recording tape comprising; a pair of tape reels adapted to store said tape at opposite ends of a path of tape movement, a pair of tape heads spaced apart along the path of tape movement, said tape heads being alternately operative such that only one of said tape heads is operative at any given time, the one of said tape reels located rearwardly of the path of tape travel at any given time with respect to the direction of travel of said tape being designated the feed reel and the other reel being designated the take-up reel, the tape head nearest said feed reel along said path of tape movement being designated the feed head and the tape head nearest said take-up reel along said path of tape movement being designated the take-up head, feed and take-up drives for moving tape past its associated tape head at a desired rate, said take-up and feed drives each being adapted when operative to drive said tape in a direction toward its associated reel, tape accumulator means intermediate said tape heads, said tape accumulator means being adjustable between a storing mode, wherein a length of said tape is stored in motion in said tape accumulator means and a feeding mode wherein opposite ends of said stored length of tape are fed simultaneously from storage in opposite directions along said path of tape travel, and tape reversing control means for activating said feed drive to reverse the direction of movement of the tape adjacent said feed head and rotation of said feed reel while said take-up drive is activated to move tape past said take-up head in the forward direction, substantially simultaneously adjusting said tape accumulator means from said storage mode to said feeding mode, wherein tape is fed simultaneously toward both tape reels, thereafter activating said feed head and deactivating said take-up head, disengaging said take-up drive and reversing the direction of said take-up reel to complete reversal of said tape, and subsequently reaccumulating a length of tape in said tape accumulator means.

16. The apparatus in accordance with claim 15 including means for sensing the approach of the end of said tape and for activating said tape reversing control means upon sensing the approach of the end of said tape.

17. The apparatus in accordance with claim 16 wherein said tape is a multichannel tape and said feed head and said take-up heads are adapted to operate with respect to different channels of said tape.

18. The apparatus in accordance with claim 17 wherein said means for sensing the approach of the end of said tape comprises indicia on said tape at a selected distance from the end of said tape and means for sensing said indicia.

* * * * *